(12) United States Patent
Kojima

(10) Patent No.: US 7,664,594 B2
(45) Date of Patent: Feb. 16, 2010

(54) STARTING SYSTEM AND METHOD OF INTERNAL COMBUSTION ENGINE

(75) Inventor: Susumu Kojima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 266 days.

(21) Appl. No.: 11/920,995

(22) PCT Filed: Jun. 14, 2006

(86) PCT No.: PCT/IB2006/001585

§ 371 (c)(1),
(2), (4) Date: Nov. 26, 2007

(87) PCT Pub. No.: WO2006/134470

PCT Pub. Date: Dec. 21, 2006

(65) Prior Publication Data

US 2009/0132155 A1     May 21, 2009

(30) Foreign Application Priority Data

Jun. 16, 2005 (JP) .............................. 2005-176792

(51) Int. Cl.
*G06F 19/00* (2006.01)
*F02N 17/00* (2006.01)
*F02D 41/06* (2006.01)

(52) U.S. Cl. .................. 701/113; 123/179.16; 701/110

(58) Field of Classification Search ... 123/179.3–179.5, 123/179.16, 478, 480, 491, 27 R; 701/101–105, 701/110, 113, 115; 60/285
See application file for complete search history.

(56) References Cited

U.S. PATENT DOCUMENTS

| 6,502,391 | B1 * | 1/2003 | Hirota et al. ................... 60/288 |
| 6,714,855 | B2 | 3/2004 | Pfitz et al. |
| 6,910,457 | B2 | 6/2005 | Grieser et al. |
| 7,079,941 | B2 * | 7/2006 | Tetsuno et al. ........... 123/179.5 |
| 7,191,746 | B2 * | 3/2007 | Nakamura ................ 123/179.3 |
| 7,562,650 | B2 * | 7/2009 | Tabata et al. ................. 123/491 |

FOREIGN PATENT DOCUMENTS

| DE | 198 48 368 A1 | 4/2000 |
| EP | 1 288 491 A2 | 3/2003 |
| EP | 1 329 622 A2 | 7/2003 |
| EP | 1 659 285 A2 | 5/2006 |
| JP | 63215878 A * | 9/1988 |
| JP | A 2004-124754 | 4/2004 |
| JP | A 2004-162707 | 6/2004 |
| JP | 2004197708 A * | 7/2004 |
| JP | 2004332599 A * | 11/2004 |

* cited by examiner

*Primary Examiner*—Willis R Wolfe, Jr.
(74) *Attorney, Agent, or Firm*—Oliff & Berridge, PLC

(57) ABSTRACT

In a starting system of an internal combustion engine, an injector for injecting fuel directly into a combustion chamber and an ignition plug for igniting an air/fuel mixture in the combustion chamber are provided, and a throttle device is provided in an intake pipe. During stopping of the engine, the starting system operates the throttle device to open a throttle valve to a predetermined throttle opening at a throttle opening speed that is set based on the intake pressure. Upon a start of the engine, the starting system actuates the injector to inject the fuel into a cylinder that is in the expansion stroke, and actuates the ignition plug to ignite the mixture in the combustion chamber.

12 Claims, 7 Drawing Sheets

STARTING SYSTEM AND METHOD OF INTERNAL COMBUSTION ENGINE

TECHNICAL FIELD

The invention relates to starting system and method of an internal combustion engine, in which fuel injection and ignition are performed in a cylinder that is in the expansion stroke, so as to start the engine by using combustion energy resulting from combustion of an air/fuel mixture formed in the expansion-stroke cylinder.

BACKGROUND ART

In recent years, various technologies for automatically stopping the engine while the vehicle is stopped in an idling state and automatically restarting the engine so as to smoothly start the vehicle have been proposed as methods for reducing or controlling exhaust emissions and improving the fuel economy. With regard to these technologies, if it takes an undesirably long time to restart the engine, the driveability may deteriorate due to a delay in response to the driver's intention of starting, and it is therefore important to quickly restart the engine. Generally, a starter motor is used for starting the engine, which makes it difficult to quickly restart the engine. Furthermore, the above-described technologies require the engine to be frequently stopped and started in a repeated fashion, resulting in reduction of service life of the starter motor and its peripheral parts, and reduction of the amount of electric power charged in the battery due to excessive use of the battery.

In view of the above problems, an engine starting system as disclosed in, for example, Japanese Laid-open Patent Publication No. 2004-124754 may be applied to a direct in-cylinder injection type engine in which fuel is injected directly into a combustion chamber rather than an intake port. The starting system disclosed in this publication makes it possible to start this type of engine without using a starter motor. When the direct in-cylinder injection type engine is restarted, the engine starting system as disclosed in the above publication controls the throttle valve to be placed in a predetermined open position for a certain period of time during a stopping process or rundown of the engine, so as to increase the resistance to the movement of pistons toward the top dead center in a cylinder that is in the compression stroke and a cylinder that is in the expansion stroke. With the throttle valve opened in this manner, the piston of each cylinder can be stopped at a suitable stopping position, and an appropriate amount of air is surely charged into the expansion-stroke cylinder.

In the conventional engine starting system as described above, the throttle valve is controlled to be placed in the predetermined open position for a certain period of time during the rundown of the engine, so that the piston of each cylinder is stopped at a suitable stopping position, and a sufficient amount of air is contained in the expansion-stroke cylinder. However, if the throttle valve is suddenly opened while the engine is being stopped, upon meeting of engine stop conditions, from an operating condition (e.g., an idling state) in which the intake manifold vacuum is large, air rapidly flows into the intake pipe, causing a problem such as occurrence of unusual sound or noise.

DISCLOSURE OF INVENTION

It is therefore an object of the invention to provide starting system and method of an internal combustion engine, for starting the engine with improved reliability and efficiency while assuring improved quietness of the engine.

To accomplish the above and/or other object(s), there is provided according to a first aspect of the invention a starting system of an internal combustion engine, which comprises: (a) a combustion chamber, (b) an intake port and an exhaust port that communicate with the combustion chamber, (c) an intake valve and an exhaust valve that open and close the intake port and the exhaust port, respectively, (d) a throttle device provided in an intake passage that communicates with the intake port, the throttle device comprising a throttle valve, (e) fuel injecting means for injecting fuel into the combustion chamber, (f) igniting means for igniting an air/fuel mixture in the combustion chamber, and (g) crank angle sensing means for detecting a crank angle of the internal combustion engine. In the starting system, control means is provided for operating the throttle device to open the throttle valve to a throttle opening that is set based on an intake pressure during stopping of the engine. The control means determines an expansion-stroke cylinder that is in an expansion stroke at the time of a start of the engine, based on the result of detection of the crank angle sensing means, and, when the engine starts, operates the fuel injecting means to inject the fuel into the expansion-stroke cylinder and operates the igniting means to ignite the air/fuel mixture in the combustion chamber of the expansion-stroke cylinder.

In the starting system of the internal combustion engine according to the first aspect of the invention, the throttle device is operated to open the throttle valve to the throttle opening that is set based on the intake pressure during stopping of the engine. Upon a start of the engine, the fuel injecting means is actuated to inject the fuel into the cylinder that is judged as being in the expansion stroke based on the result of detection of the crank angle sensing means, and the igniting means is actuated to ignite the air/fuel mixture. With the throttle valve thus opened during idle running of the engine prior to its stop, fresh air is drawn into each cylinder for scavenging, resulting in an increase of the amount of oxygen in the cylinder, and the negative pressure in the cylinder is reduced so that the piston is stopped at an appropriate position. When the engine is subsequently started, therefore, the air/fuel mixture can be ignited and burned without fail, to provide certain driving force due to combustion of the mixture, thus enabling the engine to start with improved reliability and efficiency. Furthermore, since the throttle opening to which the throttle valve is opened during stopping of the engine is set based on the intake pressure, otherwise possible occurrence of unusual sound due to rapid inflow of air can be prevented, assuring improved quietness of the engine.

In the starting system according to the first aspect of the invention, the control means may set the throttle opening to which the throttle valve is opened during stopping of the engine, such that the throttle opening decreases as the intake pressure increases.

According to a second aspect of the invention, there is provided a starting system of an internal combustion engine, comprising (a) a combustion chamber, (b) an intake port and an exhaust port that communicate with the combustion chamber, (c) an intake valve and an exhaust valve that open and close the intake port and the exhaust port, respectively, (d) a throttle device provided in an intake passage that communicates with the intake port, the throttle device comprising a throttle valve, (e) fuel injecting means for injecting fuel into the combustion chamber, (f) igniting means for igniting an air/fuel mixture in the combustion chamber, and (g) crank angle sensing means for detecting a crank angle of the internal combustion engine. In the starting system, control means is provided for operating the throttle device to open the throttle valve to a predetermined throttle opening at a throttle opening speed that is set based on the intake pressure during stopping of the engine. The control means determines an expansion-stroke cylinder that is in an expansion stroke at the time of a start of the engine, based on the result of detection of the crank angle sensing means, and, when the engine starts, operates the fuel injecting means to inject the fuel into the expansion-stroke cylinder and operates the igniting means to ignite the air/fuel mixture in the combustion chamber of the expansion-stroke cylinder.

In the starting system of the internal combustion engine according to the second aspect of the invention, the throttle device is operated to open the throttle valve to the predetermined throttle opening at the throttle opening speed that is set based on the intake pressure during stopping of the engine. Upon a start of the engine, the fuel injecting means is actuated to inject the fuel into the cylinder that is judged as being in the expansion stroke based on the result of detection of the crank angle sensing means, and the igniting means is actuated to ignite the air/fuel mixture. With the throttle valve thus opened during idle running of the engine prior to its stop, fresh air is drawn into each cylinder for scavenging, resulting in an increase of the amount of oxygen in the cylinder, and the negative pressure in the cylinder is reduced so that the piston is stopped at an appropriate position. When the engine is subsequently started, therefore, the air/fuel mixture can be ignited and burned without fail, to provide certain driving force due to combustion of the mixture, thus enabling the engine to start with improved reliability and efficiency. Furthermore, since the throttle opening speed at which the throttle valve is opened during stopping of the engine is set based on the intake pressure, otherwise possible occurrence of unusual sound due to rapid inflow of air can be prevented, assuring improved quietness of the engine.

In the starting system according to the second aspect of the invention, the control means may set the throttle opening speed at which the throttle valve is opened during stopping of the engine, such that the throttle opening speed decreases as the intake pressure increases.

In the starting system according to the first or second aspect of the invention, the throttle opening or throttle opening speed at which the throttle valve is opened during stopping of the engine may be set to the upper limit value of the throttle opening or throttle opening speed that decreases as the intake pressure increases. In this case, the upper limit value of the throttle opening or throttle opening speed at which the throttle valve is opened during stopping of the engine may be determined in view of the desired starting capability of the engine when starting and the desired quietness of the engine.

BRIEF DESCRIPTION OF DRAWINGS

The foregoing and/or further objects, features and advantages of the invention will become more apparent from the following description of exemplary embodiments with reference to the accompanying drawings, in which like numerals are used to represent like elements and wherein.

MODES FOR CARRYING OUT THE INVENTION

Starting systems of internal combustion engines as exemplary embodiments of the invention will be described in detail with reference to the drawings. It is, however, to be understood that the invention is not limited to these embodiments.

First Embodiment

Figure 1:
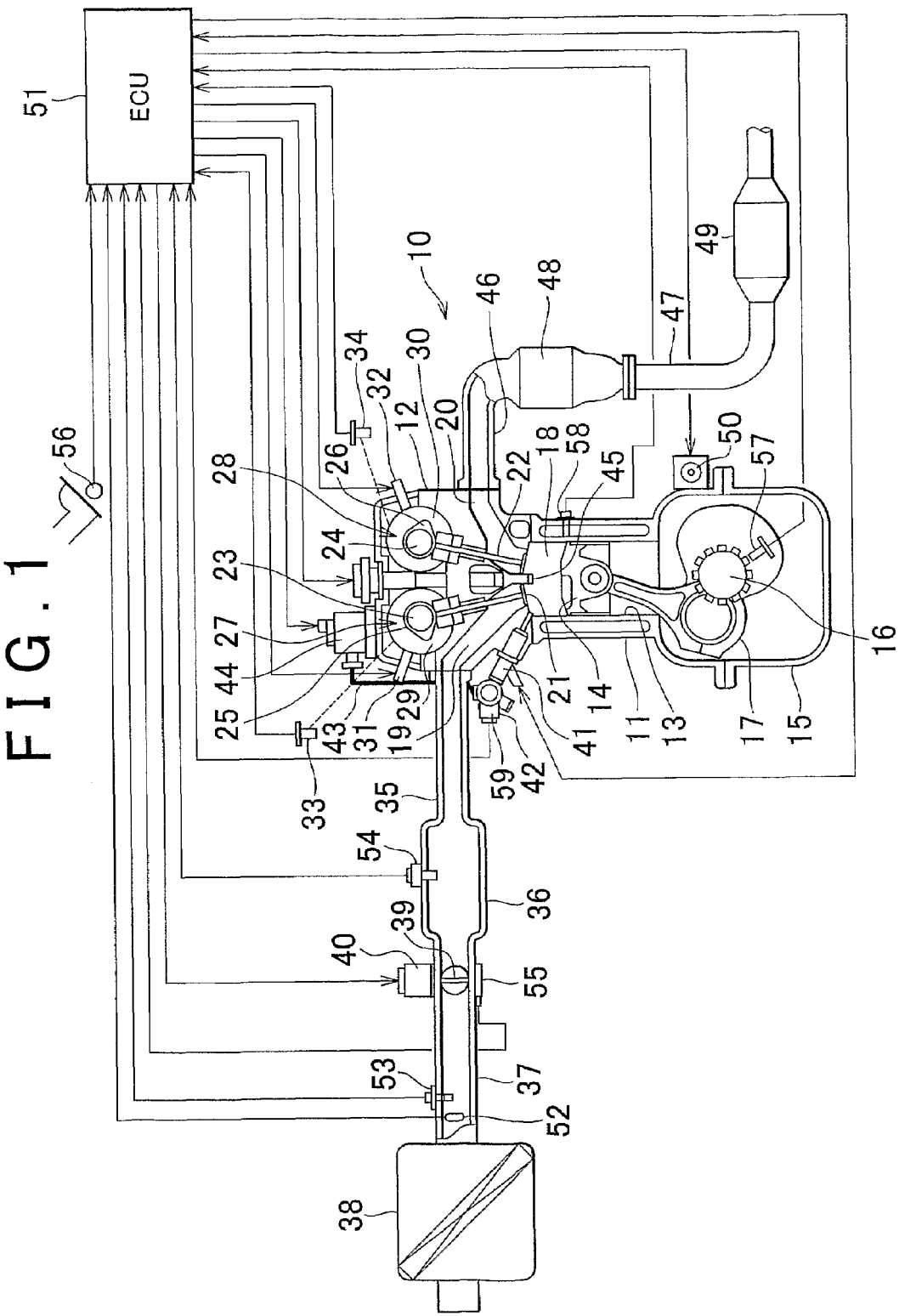
FIG. 1 is a schematic view showing a starting system of an internal combustion engine constructed according to a first embodiment of the invention.
Figure 2:
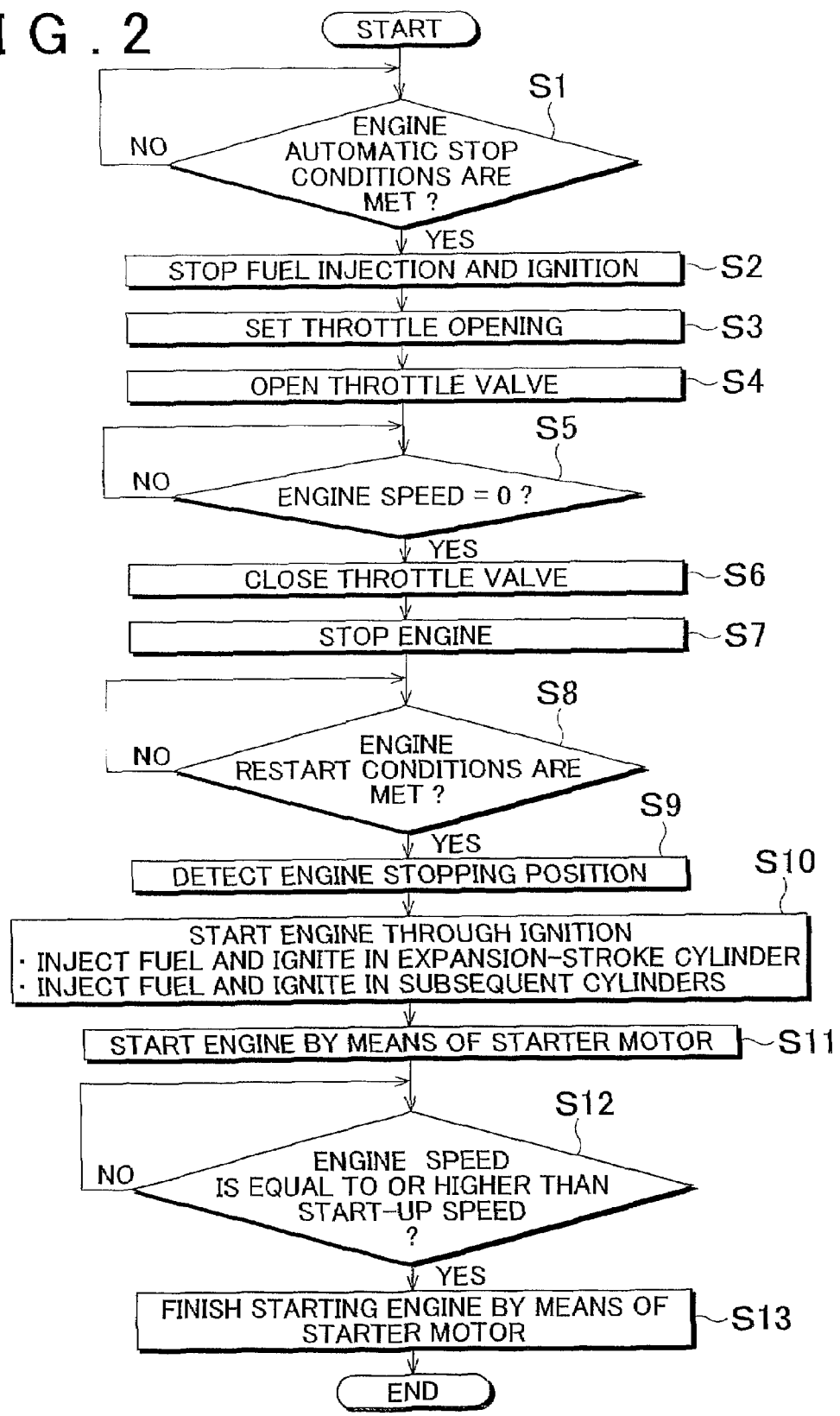
FIG. 2 is a flowchart illustrating engine stop control and start control performed by the engine starting system of the first embodiment.
Figure 3:
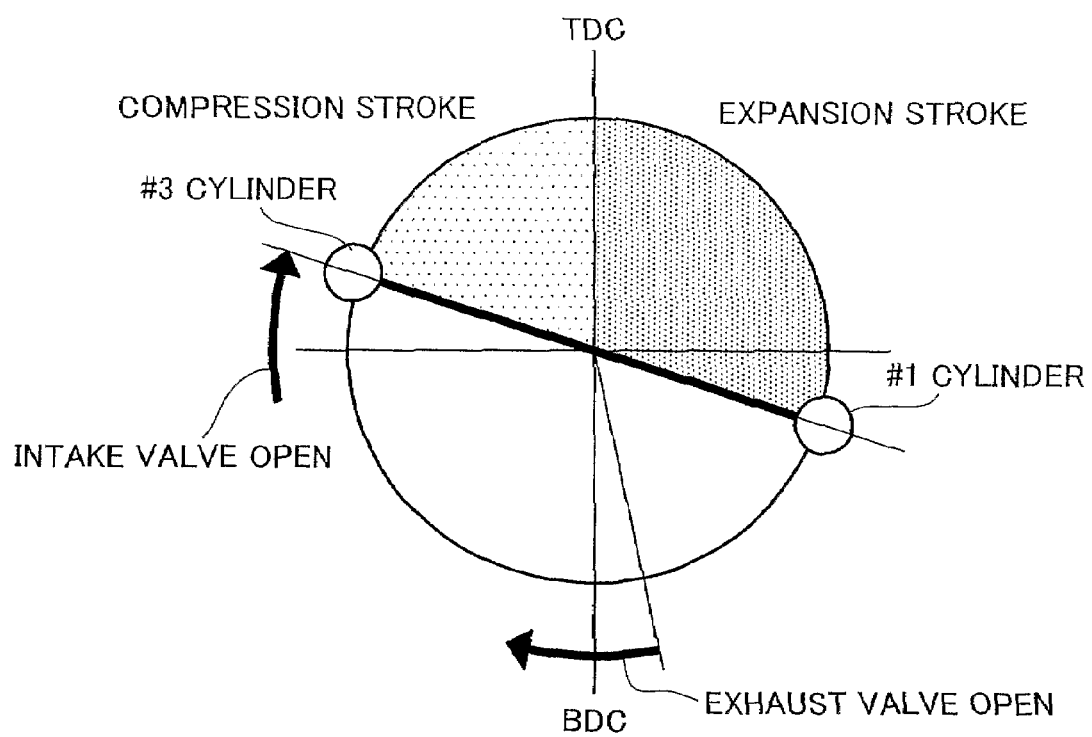
FIG. 3 is a schematic view showing the behavior of the pistons and valves in some cylinders, which is observed when the engine stops in the engine starting system of the first embodiment.
Figure 4:
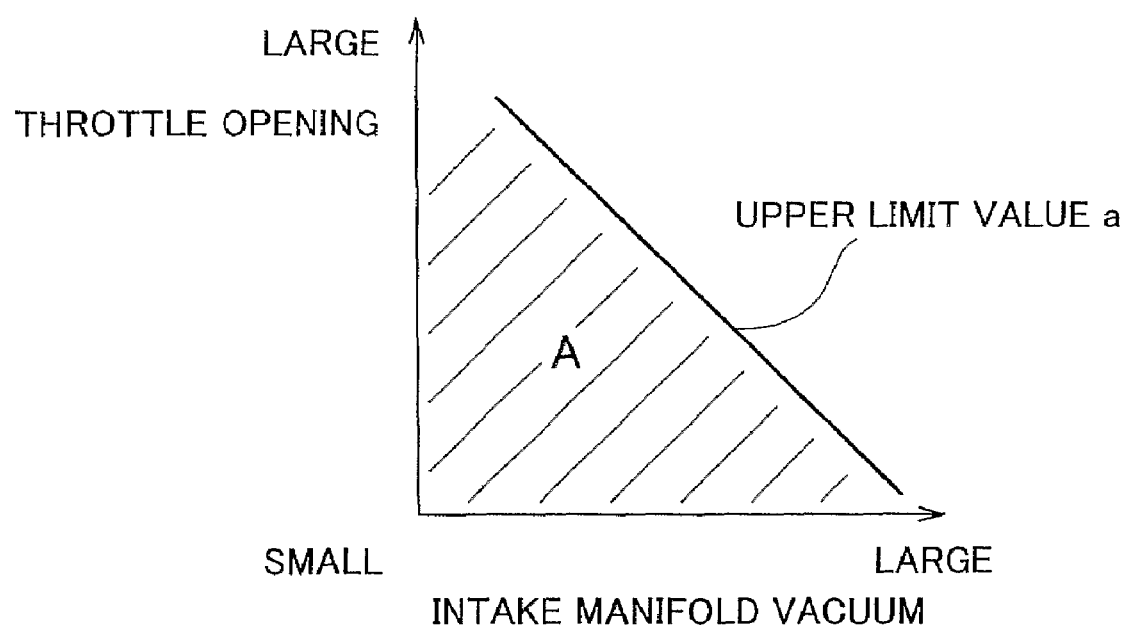
FIG. 4 is a graph indicating the throttle opening with respect to the intake manifold vacuum sensed during stopping of the engine.
Figure 5:
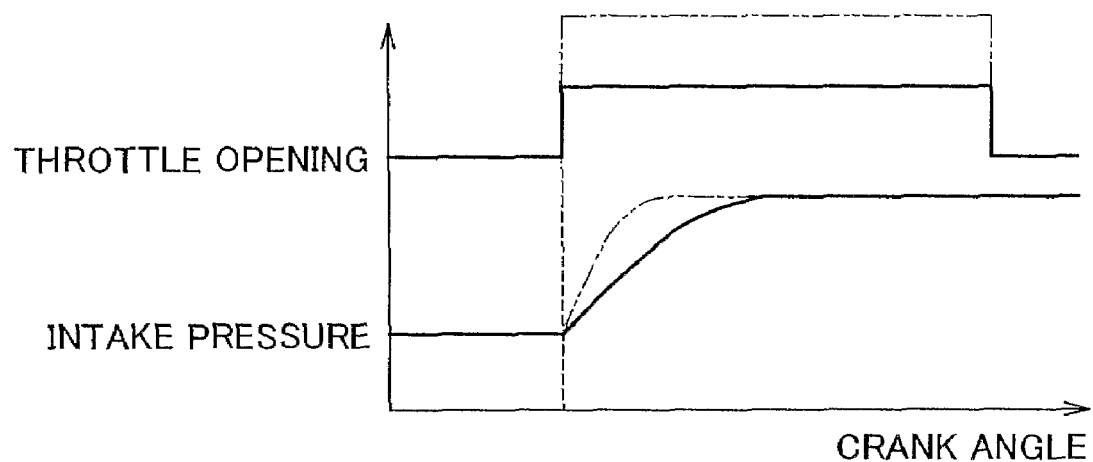
FIG. 5 is a time chart indicating changes in the throttle opening and the pressure in the intake pipe during stopping of the engine in the engine starting system of the first embodiment.

FIG. 1 schematically shows a starting system of an internal combustion engine constructed according to the first embodiment of the invention. FIG. 2 is a flowchart illustrating engine stop control and start control performed by the engine starting system of the first embodiment. FIG. 3 schematically shows the behavior of the pistons and valves in some cylinders, which is observed when the engine stops in the engine starting system of the first embodiment. FIG. 4 is a graph indicating the throttle opening with respect to the intake manifold vacuum sensed during stopping of the engine. FIG. 5 is a time chart indicating changes in the throttle opening and the pressure in the intake pipe during stopping of the engine in the engine starting system of the first embodiment.

The internal combustion engine to which the starting system of the first embodiment is applied is a four-cylinder engine 10 of direct in-cylinder injection type as shown in FIG. 1. The engine 10 includes a cylinder block 11, and a cylinder head 12 fixedly mounted on the cylinder block 11. Pistons 14 are received in cylinder bores 13 formed in the cylinder block 11, such that each of the pistons 14 can move up and down in the corresponding bore 13. A crankcase 15 is fastened to the lower part of the cylinder block 11, and a crankshaft 16 is rotatably supported in the crankcase 15. Each of the pistons 14 is connected to the crankshaft 15 via a connecting rod 17.

Each combustion chamber 18 is defined by the cylinder block 11, cylinder head 12 and the corresponding piston 14. The combustion chamber 18 is shaped like a pentroof, namely, has inclined walls that make a central portion of the upper part of the chamber 18 (i.e., the lower face of the cylinder head 12) higher than the other portions. An intake port 19 and an exhaust port 20 are formed in the upper part of the combustion chamber 18 (i.e., the lower face of the cylinder head 12) such that the intake port 19 is opposed to the exhaust port 20. An intake valve 21 and an exhaust valve 22 are mounted in the cylinder head 12 such that the lower end portions of the intake and exhaust valves 21, 22 are located at the intake port 19 and the exhaust port 20, respectively. The intake valve 21 and the exhaust valve 22 are supported by the cylinder head 12 such that the valves 21, 22 are movable in the axial directions thereof, and are biased in such directions as to close the intake port 19 and the exhaust port 20, respectively. Also, an intake camshaft 23 and an exhaust camshaft 24 are rotatably supported by the cylinder head 12, and an intake cam 25 and an exhaust cam 26 formed on the intake camshaft 23 and the exhaust camshaft 24 are in contact with the upper end portions of the intake valve 21 and exhaust valve 22, respectively, via roller rocker arms (not shown).

With the above arrangement, when the intake camshaft 23 and the exhaust camshaft 24 rotate in synchronism with the crankshaft 16, the intake cam 25 and the exhaust cam 26 actuate the respective roller rocker arms to move the intake valve 21 and the exhaust valve 22 upward and downward in certain timings. With the up-and-down movements of the intake and exhaust valves 21, 22, the intake port 19 and the exhaust port 20 are opened and closed so that the intake and exhaust ports 19, 20 are respectively brought into communication with the combustion chamber 18 and are shut off from the combustion chamber 18.

The engine 10 is equipped with valve systems in the form of intake and exhaust variable valve timing systems (VVT: Variable Valve Timing-intelligent) 27, 28 for controlling the opening and closing timings of the intake valve 21 and exhaust valve 22 to the optimum timings in accordance with the engine operating conditions. The intake and exhaust variable valve timing systems 27, 28 include VVT controllers 29, 30 which are respectively mounted on the axially end portions of the intake camshaft 23 and the exhaust camshaft 24. In operation, hydraulic pressures are applied from oil control valves 31, 32 to selected ones of the advancing chambers and retarding chambers (not shown) of the VVT controllers 29, 30, so as to change the phases of the camshafts 23, 24 relative to the cam sprockets, and thus advance or retard the opening and closing timings of the intake valve 21 and exhaust valve 22. In this case, the intake and exhaust variable valve timing systems 27, 28 advance or retard the opening and closing timings of the intake valve 21 and exhaust valve 22, respectively, while keeping the operation angles (opening periods) of these valves 21, 22 constant. In this connection, the intake camshaft 23 and the exhaust camshaft 24 are respectively provided with cam position sensors 33, 34 for sensing the phases of rotation of the camshafts 23, 24.

The intake port 19 is connected to a surge tank 36 via an intake manifold 35, and an intake pipe 37 is coupled to the surge tank 36. An air cleaner 38 is attached to an air inlet of the intake pipe 37, and an electronic throttle device 40 having a throttle valve 39 is disposed on the downstream side of the air cleaner 38. An injector 41 for injecting the fuel directly into the combustion chamber 18 is mounted in the cylinder head 12, such that the injector 41 is located close to the intake port 19 and is inclined a certain angle with respect to the vertical direction. The injectors 41 provided for the respective cylinders are connected to one another by a delivery pipe 42, and a high-pressure pump 44 is connected to the delivery pipe 42 via a fuel supply pipe 43. To the high-pressure pump 44 are connected a low-pressure pump and a fuel tank via fuel supply pipes (not shown). Furthermore, an ignition plug 45 for igniting an air/fuel mixture is mounted in the cylinder head 12, such that the ignition plug 45 is located upwardly of the combustion chamber 18.

On the other hand, an exhaust pipe 47 is connected to the exhaust port 20 via an exhaust manifold 46, and catalyst devices or catalytic converters 48, 49 for removing or treating harmful substances, such as HC, CO and NOx, contained in exhaust gas are mounted in the exhaust pipe 47. The engine 10 is also provided with a starter motor 50 for starting the engine 10 through cranking. To start the engine 10, a pinion gear (not shown) of the starter motor 50 meshes with a ring gear, and rotary motion or driving force is then transmitted from the pinion gear to the ring gear so as to rotate the crankshaft 16.

In the meantime, an electronic control unit (ECU) 51 is installed in the vehicle. The ECU 51 is capable of controlling the injector 41 and the ignition plug 45. More specifically, an air flow meter 52 and an intake air temperature sensor 53 are mounted on the upstream side of the intake pipe 37 while an intake pressure sensor 54 is provided in the surge tank 36, and the specific volume of intake air, intake air temperature and the intake pressure (the intake manifold vacuum) measured by these sensors 52, 53, 54 are transmitted to the ECU 51. A throttle position sensor 55 is mounted in the electronic throttle device 40 and outputs the current throttle opening to the ECU 51, and an accelerator position sensor 56 is provided for outputting the current position of the accelerator pedal to the ECU 51. Furthermore, a crank angle sensor 57 is provided for outputting the detected crank angle of each cylinder to the ECU 51, and the ECU 50 determines which of the intake, compression, expansion (explosion) and exhaust strokes each cylinder is going through, and calculates the engine speed, based on the detected crank angle. In addition, a water temperature sensor 58 is provided in the cylinder block 11 for sensing the engine coolant temperature and outputting the sensed coolant temperature to the ECU 51. A fuel pressure sensor 59 is provided in the delivery pipe 42 that communicates with the respective injectors 41, for sensing the fuel pressure in the pipe 42 and outputting the sensed fuel pressure to the ECU 51.

With the above arrangement, the ECU 51 is operable to drive the high-pressure pump 44 based on the sensed fuel pressure so that the fuel pressure becomes equal to a predetermined pressure level. The ECU 51 is also operable to determine the fuel injection amount, injection timing, ignition timing, and others, based on the engine operating conditions, such as the detected specific volume of intake air, intake air temperature, intake pressure, throttle opening, accelerator pedal position, engine speed, and engine coolant temperature, and drive the injector 41 and the ignition plug 45 so as to carry out injection of the fuel and ignition of the air/fuel mixture.

The ECU 51 is also capable of controlling the intake and exhaust variable valve timing systems 27, 28 based on the engine operating conditions. More specifically, when the engine runs at a low temperature or at a light load, or when the engine starts or runs at idle, the variable valve timing systems 27, 28 are controlled to eliminate an overlap between the opening period of the exhaust valve 22 and the opening period of the intake valve 21 so as to reduce the amount of exhaust gas that flows back to the intake port 19 or the combustion chamber 18, for improvements in the combustion stability and fuel economy or efficiency. When the engine runs at a middle load, the systems 27, 28 are controlled to increase the above-described overlap, thereby to increase the internal EGR rate and enhance the exhaust gas purification (emission control) efficiency while reducing the pumping loss for improved fuel economy. When the engine runs at a high load and a low or middle speed, the ECU 51 operates to advance the closing timing of the intake valve 21 so as to reduce the amount of intake air that flows back into the intake port 19 for improved volumetric efficiency. When the engine runs at a high load and a high speed, the ECU 51 operates to retard the closing timing of the intake valve 21 in accordance with the engine speed, so as to provide valve timing that matches the inertial force of the intake air for improved volumetric efficiency.

The engine 10 constructed as described above has an automatic engine stop function for automatically stopping the engine 10 when the vehicle is stopped in an idling state, and an engine restart function for automatically restarting the engine 10 in response to a start command when the engine 10 is in an automatically stopped state. In this embodiment, when the engine 10 is restarted, a direct in-cylinder injection mechanism is used for starting the engine 10 through ignition and combustion of the air/fuel mixture, in addition to the use of the starter motor 50.

More specifically, after the engine 10 is brought to a stop, the ECU 51 serving as a control means or controller determines a cylinder in which the piston 14 is stopped in the expansion stroke, based on the result of detection of the crank angle sensor 57. When the engine 10 is subsequently restarted, the ECU 51 operates to inject the fuel into the cylinder that is stopped in the expansion stroke, and ignite and burn the air/fuel mixture so as to provide explosive force, which is used to move the piston 14 and drive the crankshaft 16. The ECU 51 then operates to drive the starter motor 50 so as to give driving force to the crankshaft 16 and thus restart the engine 10.

In the present embodiment in which the engine 10 is a four-cylinder in-line engine of a direct in-cylinder injection type, when the piston 14 of the first cylinder #1 goes beyond the top dead center (TDC) and stops in the expansion stroke, for example, the piston 14 of the third cylinder #3 following the first cylinder #1 stops in the compression stroke, as shown in FIG. 3. In this condition, fuel injection and ignition are performed in the first cylinder #1 that is stopped in the expansion stroke so that the air/fuel mixture burns to produce explosive force, and the explosive force produced in the first cylinder #1 pushes down the piston 14 of the first cylinder #1 and at the same time moves up the piston 14 of the third cylinder #3 via the crankshaft 16. In order to enable the third cylinder #3 in the compression stroke to acquire force for elevating the piston 14 and compressing air in the combustion chamber 18 from the explosive force produced in the first cylinder #1, it is desirable to stop the first cylinder #1 in the latter half of the expansion stroke beyond TDC, and stop the third cylinder #3 in the latter half of the compression stroke beyond BDC.

In the present embodiment, the throttle valve 39 is opened only for a certain period during a stopping process (idle running) or rundown of the engine 10, so that the piston 14 of the cylinder that is to be stopped in the expansion stroke at the time of a stop of the engine is stopped at a predetermined stopping position in the expansion stroke, assuring an appropriate amount of oxygen contained in the cylinder stopped in the expansion stroke. If the throttle valve 39 is opened during the rundown of the engine, however, air rapidly flows into the intake pipe 37 located downstream of the throttle valve 39, causing unusual sound or noise. Especially, the unusual sound is likely to occur if the throttle valve 39 is abruptly opened while the engine 10 is being stopped from an operating state, such as an idling state, in which the intake manifold vacuum or negative pressure in the intake pipe 37 is large.

In this embodiment, therefore, the electronic throttle device 40 causes the throttle valve 39 to be opened to a throttle opening that is set based on the intake manifold vacuum during the rundown of the engine 10, so as to stop the piston 14 at the predetermined position in the expansion stroke, while preventing the unusual sound or noise and assuring an appropriate amount of oxygen in the cylinder that is stopped in the expansion stroke. When the engine 10 is subsequently restarted, fuel injection and ignition are performed in the cylinder that is in the expansion stroke, so that the engine 10 can be started with high reliability.

Referring to FIG. 4, the unusual sound or noise is more likely to occur during rundown of the engine as the throttle opening to which the throttle valve is opened during the rundown of the engine 10 is larger, or as the intake manifold vacuum measured in this period is larger. In order to suppress or eliminate the unusual sound and ensure desired quietness of the engine 10, therefore, it is desirable to perform control of the throttle valve 39 during the rundown of the engine 10 in region A (as indicated in FIG. 4) in which the upper limit of the throttle opening decreases as the intake manifold vacuum increases. Meanwhile, in order to enable the engine 10 to restart with high reliability and efficiency through control of the amount of oxygen in the cylinder stopped in the expansion stroke and the stopping position of the piston in the same cylinder, it is desirable to set the opening of the throttle valve 39 as large as possible during the rundown of the engine 10. Thus, the throttle opening of the throttle valve 39 is set to the upper limit value "a" of region A in FIG. 4 during the rundown of the engine 10, in view of the restarting capability and quietness of the engine 10.

Referring next to the flowchart of FIG. 2, engine stop control and restart control of the engine starting system of the first embodiment as described above will be described in detail.

As shown in FIG. 1 and FIG. 2, the ECU 51 determines in step S1 whether automatic stop conditions for stopping the engine 10 during operation of the vehicle are met. Here, the automatic stop of the engine 10 means stopping the engine 10 while it is idling, or so-called "idle stop". In this case, the automatic stop conditions include, for example, those in which the vehicle speed is 0 km/h, the brake switch is in the ON state, and the shift lever is kept in the neutral (N) position for a predetermined time. When the vehicle is in these conditions, the ECU 51 determines that the vehicle is stopped, for example, at a red light, and the automatic stop conditions are met. It is, however, to be understood that the engine 10 may be stopped while the vehicle is decelerating. In this case, the automatic stop conditions for stopping the engine 10 may include, for example, those in which the vehicle speed is equal to or lower than a certain speed, the engine speed is equal to or lower than a certain speed, the engine coolant temperature is equal to or lower than a certain temperature level, and the air conditioner is in the OFF state. With the vehicle being in these conditions, the ECU 51 determines that the vehicle is decelerating, and the automatic stop conditions are met.

If it is determined in step S1 that the automatic stop conditions for the engine 10 are met, the ECU 51 proceeds to step S2 to disable the injector 41 from injecting the fuel, and disable the ignition plug 45 from igniting the air/fuel mixture. In the following step S3, the ECU 51 sets the throttle opening to which the throttle valve 39 is opened by the electronic throttle device 40. In this case, the ECU 51 sets the throttle opening to the upper limit value "a" with reference to the map shown in FIG. 4, based on the intake pressure (i.e., the intake manifold vacuum) detected by the intake pressure sensor 54. Once the throttle opening is set in step S3, the ECU 51 proceeds to step S4 to operate the electronic throttle device 40 to open the throttle valve 39 to the set throttle opening.

If the throttle valve 39 is opened during the rundown of the engine 10, air in the intake pipe 37 flows toward the surge tank 36 through the throttle valve 39, and the intake pressure is raised to a positive pressure. As a result, the piston 14 to be stopped in the expansion stroke is stopped at a suitable stopping position in the expansion stroke while the inflow of air causes scavenging of each cylinder, thus assuring an appropriate amount of oxygen in the cylinder that is stopped in the expansion stroke. Furthermore, since the throttle opening to which the throttle valve 39 is opened during the rundown of the engine is appropriately set as described above, air is prevented from rapidly flowing into the surge tank 36 via the throttle valve 39, and otherwise possible unusual sound is suppressed or eliminated.

In step S5, it is determined whether the engine speed becomes equal to 0. If the engine speed becomes equal to 0, step S6 is executed to operate the electronic throttle device 40 to close the throttle valve 39, and the engine is stopped in step S7.

Subsequently, it is determined in step S8 whether engine restart conditions are met while the engine 10 is in an automatically stopped state. The restart conditions for the engine 10 may include, for example, those in which the vehicle speed is equal to 0 km/h, the brake switch is in the ON state, and the shift lever is in the running (1, 2, D, or R) position. With these conditions satisfied, the ECU 51 determines that the driver has an intention of starting the vehicle, and the restart conditions are met. If it is determined in step S8 that the restart conditions for starting the engine 10 are met, step S10 and subsequent steps are executed to start the engine 10 through ignition and combustion of the air/fuel mixture.

More specifically, prior to a restart of the engine, the ECU 51 determines in step S9 which of the cylinders is stopped in the expansion stroke, based on the result of detection of the crank angle sensor 57. In step S10, a certain amount of fuel is injected from the injector 41 into the combustion chamber 18 of the cylinder that is stopped in the expansion stroke, and the air/fuel mixture is ignited by the ignition plug 45, so that the mixture starts burning in the cylinder, to provide explosive force that causes the piston 14 to move downward.

When the combustion takes place in the cylinder stopped in the expansion stroke, to push down the piston 14 of the same cylinder, the crankshaft 16 rotates, and the force derived from the rotation is transmitted to the cylinder following the cylinder stopped in the expansion stroke, namely, to the cylinder that is stopped in the compression stroke, so as to move up the piston 14 of the cylinder stopped in the compression stroke. When the cylinder stopped in the compression stroke goes through the compression stroke and reaches the expansion stroke, a certain amount of fuel is injected from the injector 41 into the cylinder, and the air/fuel mixture is ignited by the ignition plug 45, in the manners as described above, so that the mixture starts burning in the cylinder, to provide explosive force that causes the piston 14 to move downward.

When the piston 14 of the cylinder stopped in the expansion stroke starts moving downward due to the force resulting from the fuel injection, ignition and combustion in the combustion chamber 18 of the same cylinder, step S11 is executed to start the starter motor 50 to start the engine 10. In step S10, the cylinders that follow the cylinders stopped in the expansion stroke and in the compression stroke go through induction of air, injection of fuel and ignition in normal manners. More specifically, air is drawn from the intake port 19 into each of the subsequent cylinders while a certain amount of fuel is injected from the injector 41 into the cylinder, and the air/fuel mixture is ignited by the ignition plug 45 and burns to provide explosive force that causes the piston 14 to move downward. Thus, the explosive force produced in each of the cylinders is kept acting on the engine 10 for a certain period of time, and the driving force is applied from the starter motor 50 to the engine 10, so that the engine 10 is restarted.

In step S12, it is determined whether the engine speed has risen to a predetermined start-up speed. If the engine speed becomes equal to or higher than the start-up speed, the ECU 51 proceeds to step S13 to finish starting the engine 10 by means of the starter motor 50. In this manner, the engine 10 is appropriately restarted.

Referring next to FIG. 5, changes in the opening of the throttle valve 39 and the intake pressure during the rundown of the engine 10 will be described. During the rundown of the engine 10, if the throttle valve 39 is opened to a relatively large throttle opening as indicated by a two-dot chain line in FIG. 5, as in the conventional system, the intake pressure is sharply increased (as indicated by a two-dot chain line in FIG. 5) due to rapid inflow of air, and unusual sound or noise may be generated. On the other hand, if the throttle valve 39 is opened to an appropriately controlled throttle opening as indicated by a solid line in FIG. 5, as in this embodiment, air is kept from rapidly flowing into the intake pipe 37, and the intake pressure is gently increased, resulting in reduction or elimination of the unusual sound.

As described above, the engine starting system of the first embodiment is provided with the injector 41 for injecting fuel directly into the combustion chamber 18, the ignition plug 45 for igniting the air/fuel mixture in the combustion chamber 18, and the electronic throttle device 40 located in the intake pipe 37. During the rundown of the engine 10, the starting system operates the throttle device 40 to open the throttle valve 39 to the throttle opening that is set based on the intake pressure (i.e., the negative pressure in the intake pipe 37 or intake manifold vacuum). Upon a start of the engine 10, the starting system actuates the injector 41 to inject fuel into the cylinder that is in the expansion stroke, and actuates the ignition plug 45 to ignite the air/fuel mixture in the combustion chamber 18 of the same cylinder.

By opening the throttle valve 39 during the rundown of the engine 10, it is possible to draw fresh air into each of the cylinders for scavenging, thereby to increase the amount of oxygen in the cylinder, and to reduce the negative pressure in the cylinder so that the piston 14 stopped in the expansion stroke is stopped at the appropriate position. When the engine 10 is subsequently restarted, therefore, the air/fuel mixture in the cylinder stopped in the expansion stroke can be ignited and burned without fail to provide certain driving force, thus enabling the engine 10 to start with improved reliability and efficiency. In addition, since the throttle opening to which the throttle valve is opened during the rundown of the engine 10 is set based on the intake pressure or intake manifold vacuum, unusual sound that would otherwise occur due to rapid inflow of air is suppressed or eliminated, and the engine 10 can be quietly stopped.

The unusual sound or noise generated upon opening of the throttle valve 39 during rundown of the engine 10 is less likely to occur as the throttle opening is smaller or as the intake manifold vacuum is smaller. While the restarting characteristics of the engine 10, i.e., the reliability and efficiency with which the engine 10 is restarted, are influenced by the amount of oxygen in the cylinder stopped in the expansion stroke and the stopping position of the piston 14 in the same cylinder, these restarting characteristics improve as the opening of the throttle valve 39 increases. In view of the quietness and restarting capability of the engine 10, therefore, the opening of the throttle valve 39 during the rundown of the engine 10 is set to the upper limit value "a" of region A (in FIG. 4) in which the upper limit of the throttle opening decreases as the intake manifold vacuum increases.

Thus, the starting system of the illustrated embodiment makes it possible to surely suppress unusual sound that would occur during the rundown of the engine 10 while assuring sufficiently high reliability and efficiency in restarting the engine 10, thus achieving the compatibility between the quietness and restarting capability of the engine 10.

Second Embodiment

Figure 6:
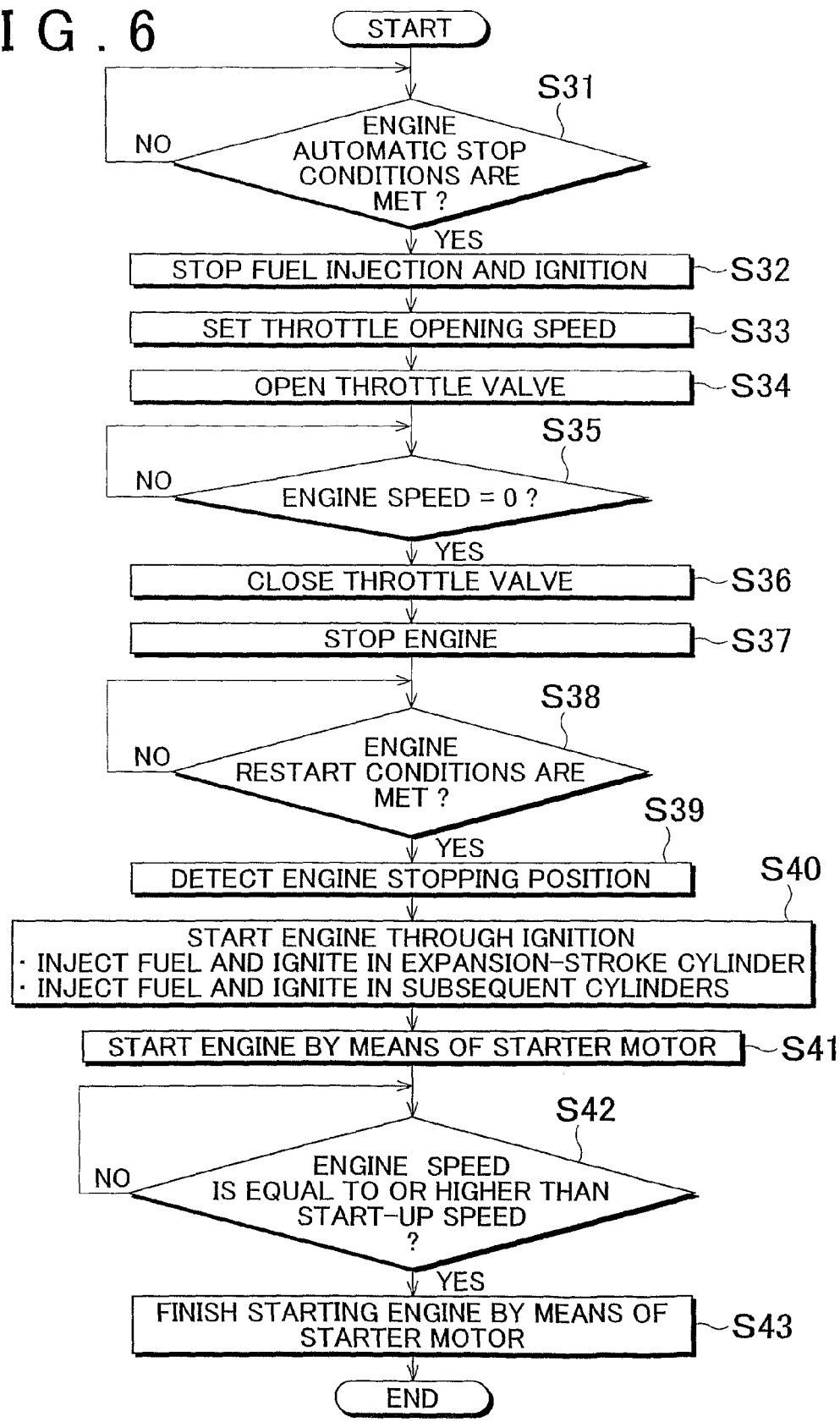
FIG. 6 is a flowchart illustrating engine stop control and start control performed by a starting system of an internal combustion engine constructed according to a second embodiment of the invention.
Figure 7:
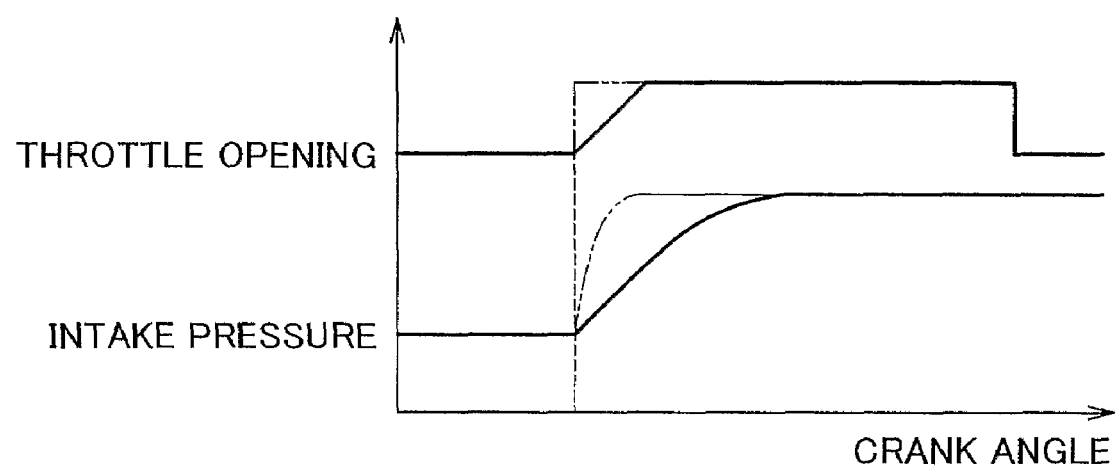
FIG. 7 is a time chart indicating the throttle opening speed and the pressure in the intake pipe during stopping of the engine in the engine starting system of the second embodiment.

FIG. 6 is a flowchart illustrating engine stop control and start control performed by a starting system of an internal combustion engine as the second embodiment of the invention. FIG. 7 is a time chart showing the throttle opening speed and the pressure in the intake pipe observed during stopping of the engine in the engine starting system of the second embodiment. The whole construction of the engine starting system of this embodiment is substantially the same as that of the first embodiment as described above, and will be described with reference to FIG. 1. In the following description, the same reference numerals as used in the explanation of the first embodiment will be used for identifying structurally and/or functionally corresponding elements, of which detailed description will not be provided.

Like the engine starting system of the first embodiment as described above, the engine starting system of the second embodiment has the function of automatically stopping the engine 10 when the vehicle is stopped in an idling state, and the function of automatically restarting the engine 10 in response to a start command while the engine 10 is in an automatically stopped state, as shown in FIG. 1. More specifically, after the engine 10 is stopped, the ECU 51 determines the cylinder in which the piston 14 is stopped in the expansion stroke. Upon a restart of the engine 10, the ECU 51 operates to inject fuel into the cylinder stopped in the expansion stroke, and ignite and burn the air/fuel mixture to provide force due to explosion of the mixture, which force is used to move the piston 14 and drive the crankshaft 16. The ECU 51 then operates to drive the starter motor 50 so as to give driving force to the crankshaft 16, thereby to restart the engine 10.

In the present embodiment, the throttle valve 39 is opened only for a certain period of time during stopping or rundown of the engine 10, so that the piston 14 stopped in the expansion stroke is located at a predetermined stopping position in the expansion stroke, and an appropriate amount of oxygen is surely contained in the cylinder stopped in the expansion stroke. In addition, the starting system of this embodiment sets the throttle opening speed at which the throttle valve 39 is opened during the rundown of the engine, based on the intake manifold vacuum, so as to prevent rapid inflow of air and suppress or eliminate unusual sound or noise due to such rapid inflow of air.

As in the case of the throttle opening of the first embodiment, the throttle opening speed at which the throttle valve 39 is opened during the rundown of the engine 10 is set to the upper limit value of a region in which the upper limit of the throttle opening speed decreases as the intake manifold vacuum increases, in view of the restarting capability and quietness of the engine 10.

Referring to the flowchart of FIG. 6, the engine stop control and restart control performed by the engine starting system of the second embodiment as described above will be described in detail.

As shown in FIG. 1 and FIG. 6, the ECU 51 determines in step S31 whether automatic stop conditions for automatically stopping the engine 10 are met during operation of the vehicle. If it is determined in step S31 that the automatic stop conditions for the engine 10 are met, the ECU 51 proceeds to step S32 to disable the injector 41 from injecting fuel and disable the ignition plug 45 from igniting the air/fuel mixture. In the following step S33, the ECU 51 sets the throttle opening speed at which the throttle valve 39 is opened by the electronic throttle device 40, based on the intake pressure (i.e., the intake manifold vacuum) detected by the intake pressure sensor 54. Once the throttle opening speed is set in step S33, the ECU 51 proceeds to step S34 to operate the electronic throttle device 40 to open the throttle valve 39 at the opening speed set in step S33 to provide a predetermined throttle opening.

When the throttle valve 39 is opened during the rundown of the engine 10, air in the intake pipe 37 flows toward the surge tank 36 through the throttle valve 39, so that the intake pressure is raised to a positive pressure. As a result, the piston 14 that is stopped in the expansion stroke is placed at a certain stopping position in the expansion stroke, and the inflow of air causes scavenging of each cylinder, thus ensuring an appropriate amount of oxygen in the cylinder stopped in the expansion stroke. Furthermore, since the throttle valve 39 is opened by a predetermined angle at the appropriately set speed during the rundown of the engine, air is prevented from rapidly flowing into the surge tank 36 via the throttle valve 39, and otherwise possible unusual sound or noise is suppressed or eliminated.

In step S35, it is determined whether the engine speed becomes equal to 0. If the engine speed becomes equal to 0, the ECU 51 proceeds to step S36 to operate the electronic throttle device 40 to close the throttle valve 39, and then to step S37 to stop the engine 10.

Subsequently, it is determined in step S38 whether engine restart conditions are met while the engine 10 is in an automatically stopped state. If it is determined in step S38 that the engine restart conditions for the engine 10 are met, step S40 and subsequent steps are executed to start the engine 10 through ignition and combustion of the air/fuel mixture. More specifically, prior to a restart of the engine 10, the ECU 51 determines in step S39 which of the cylinders is stopped in the expansion stroke, based on the result of detection of the crank angle sensor 57. In step S40, a certain amount of fuel is injected from the injector 41 into the combustion chamber 18 of the cylinder that is stopped in the expansion stroke, and then the air/fuel mixture is ignited by the ignition plug 45, so that the mixture starts burning in the cylinder to provide explosive force for moving the piston 14 downward.

Once the air/fuel mixture starts burning in the cylinder stopped in the expansion stroke so as to move the piston 14 downward, the crankshaft 16 rotates, and the rotary motion or resulting force is transmitted to the cylinder that follows the cylinder stopped in the expansion stroke, namely, to the cylinder that is stopped in the compression stroke. As a result, the piston 14 of the cylinder stopped in the compression stroke moves upward to resume the compression stroke. When this cylinder then reaches the expansion stroke, a certain amount of fuel is injected from the injector 41 into the cylinder, and the air/fuel mixture is then ignited by the ignition plug 45, in the same manners as described above, so that the mixture starts burning in the cylinder to provide explosive force for pushing down the piston 14.

When the piston 14 starts moving downward due to the explosive force resulting from fuel injection, ignition and combustion in the combustion chamber 18 of the cylinder stopped in the expansion stroke, the ECU 51 executes step S41 to start the starter motor 50 so as to start the engine 10. In step S40, the cylinders that follow the cylinders stopped in the expansion stroke and in the compression stroke go through induction of air, injection of fuel and ignition in normal manners. More specifically, air is drawn from the intake port 19 into each of the subsequent cylinders while a certain amount of fuel is injected from the injector 41 into the cylinder, and the air/fuel mixture is ignited by the ignition plug 45 and burns to provide explosive force that causes the piston 14 to move downward. Thus, the explosive force produced in each of the cylinders is kept acting on the engine 10 for a certain period of time, and the driving force is applied from the starter motor 50 to the engine 10, so that the engine 10 is restarted.

It is then determined in step S42 whether the engine speed has risen to be equal to or higher than a predetermined start-up speed. If the engine speed becomes equal to or higher than the start-up speed, the ECU 51 proceeds to step S43 to finish starting the engine 10 by means of the starter motor 50. In this manner, the engine 10 is appropriately restarted.

Referring next to FIG. 7, changes in the opening and opening speed of the throttle valve 39 and the intake pressure during the stopping process or rundown of the engine 10 will be described. As shown in FIG. 7, if the throttle valve 39 is opened at a large throttle opening speed as indicated by a two-dot chain line in FIG. 7 during stopping of the engine 10, as in the conventional system, the intake pressure is sharply increased due to rapid inflow of air, and unusual sound or noise may be generated. On the other hand, if the throttle valve 39 is opened at the appropriately set speed as indicated by a solid line in FIG. 7, as in this embodiment, air is kept from rapidly flowing into the intake pipe 37, and the intake pressure is gently increased, resulting in reduction or elimination of the unusual sound.

As described above, the engine starting system of the second embodiment is provided with the injector 41 for injecting fuel directly into the combustion chamber 18, the ignition plug 45 for igniting the air/fuel mixture in the combustion chamber 18, and the electronic throttle device 40 located in the intake pipe 37. During the rundown of the engine 10, the starting system operates the throttle device 40 to open the throttle valve 39 to a certain throttle opening at the throttle opening speed that is set based on the intake pressure (i.e., the negative pressure in the intake pipe 37 or intake manifold vacuum). When the engine 10 is subsequently restarted, the starting system operates the injector 41 to inject the fuel into the cylinder that is in the expansion stroke, and operates the ignition plug 45 to ignite the air/fuel mixture formed in the combustion chamber 18 of the expansion-stroke cylinder.

By opening the throttle valve 39 during the rundown of the engine 10, it is possible to draw fresh air into each of the cylinders for scavenging, thereby to increase the amount of oxygen in the cylinder, and to reduce the negative pressure in the cylinder so that the piston 14 stopped in the expansion stroke is placed at an appropriate position. When the engine 10 is subsequently restarted, therefore, the air/fuel mixture in the cylinder stopped in the expansion stroke can be ignited and burned without fail to provide certain driving force, thus enabling the engine 10 to restart with improved reliability and efficiency. In addition, since the throttle opening speed at which the throttle valve is opened during the rundown of the engine 10 is set based on the intake manifold vacuum, unusual sound that would otherwise occur due to rapid inflow of air is suppressed or eliminated, and the engine 10 can be quietly stopped.

The unusual sound or noise generated upon opening of the throttle valve 39 during rundown of the engine 10 is less likely to occur as the throttle opening speed is lower or as the intake manifold vacuum is smaller. While the restarting characteristics, namely, the reliability and efficiency with which the engine 10 is restarted, are influenced by the amount of oxygen in the cylinder stopped in the expansion stroke and the stopping position of the piston 14 in the same cylinder, these restarting characteristics improve as the opening of the throttle valve 39 increases. In view of the quietness and restarting characteristics of the engine 10, therefore, the opening speed of the throttle valve 39 during the rundown of the engine 10 is set to the upper limit value of a region in which the upper limit of the throttle opening speed decreases as the intake manifold vacuum increases.

Thus, the starting system of the illustrated embodiment makes it possible to surely suppress unusual sound that would occur during the rundown of the engine 10 while assuring sufficiently high reliability and efficiency in restarting the engine 10, thus achieving the compatibility between the quietness and restarting capability of the engine 10.

In the illustrated embodiments, when the engine 10 is restarted, the fuel is injected into the combustion chamber 18 of the cylinder stopped in the expansion stroke, and the air/fuel mixture in the same cylinder is ignited and burned. In this case, the amount of the fuel injected into the combustion chamber 18 may be set based on the crank angle at which the engine 10 is stopped, the engine coolant temperature, and the pressure in the crankcase. Since the volume of the combustion chamber 18 is derived from the crank angle at which the engine 10 is stopped, and the air density is derived from the engine coolant temperature, while the pressure in the cylinder is derived from the pressure in the crankcase, the fuel injection amount can be set to the optimum value on the basis of these data.

While the engine starting system of the invention is in the form of a restarting system for restarting the engine 10 that has been automatically stopped in the illustrated embodiments, the invention may be equally applied to a starting system for starting the engine 10 in response to the manipulation of the ignition key switch, from a condition in which the engine 10 is completely stopped.

While the engine starting system of the invention is employed in the four-cylinder engine of direct in-cylinder injection type, the invention is not limitedly applied to this type of engine, but may be applied to six-cylinder or other multi-cylinder engines or in-line or V-type engines.

INDUSTRIAL APPLICABILITY

In the internal combustion engine that starts by using explosive force resulting from fuel injection, ignition and combustion in a cylinder that is in the expansion stroke at the time of start of the engine, the starting system constructed according to the invention operates during stopping of the engine to open the throttle valve to a throttle opening that is set based on the intake pressure, or open the throttle valve to a certain opening at a throttle opening speed that is set based on the intake pressure, so as to prevent occurrence of unusual sound or noise. Thus, the invention may be applied to any type of internal combustion engine provided that it is of a direct in-cylinder injection type.

The invention claimed is:

1. A starting system of an internal combustion engine, comprising a combustion chamber, an intake port and an exhaust port that communicate with the combustion chamber, an intake valve and an exhaust valve that open and close the intake port and the exhaust port, respectively, comprising:

a throttle device provided in an intake passage that communicates with the intake port, the throttle device comprising a throttle valve:

fuel injecting means for injecting fuel into the combustion chamber igniting means for igniting an air/fuel mixture in the combustion chamber;

crank angle sensing means for detecting a crank angle of the internal combustion engine; and control means for operating the throttle device to open the throttle valve to a predetermined throttle opening at a throttle opening speed that is set based on an intake pressure during stopping of the engine, and for determining an expansion-stroke cylinder that is in an expansion stroke at the time of a start of the engine, based on the result of detection of the crank angle sensing means wherein when the engine starts, the control means operates the fuel injecting means to inject the fuel into the expansion-stroke cylinder, and operates the igniting means to ignite the air/fuel mixture in the combustion chamber of the expansion-stroke cylinder.

2. A starting system as defined in claim 1, wherein the control means sets the throttle opening speed at which the throttle valve is opened during stopping of the engine, such that the throttle opening speed decreases as the intake pressure increases.

3. A starting system as defined in claim 1, wherein the throttle opening speed at which the throttle valve is opened during stopping of the engine is set to the upper limit value of the throttle opening speed that decreases as the intake pressure increases.

4. A starting system as defined in claim 3, wherein the upper limit value of the throttle opening speed at which the throttle valve is opened during stopping of the engine is determined in view of the starting capability of the engine when starting and the quietness of the engine.

5. A starting system of an internal combustion engine including a combustion chamber, an intake port and an exhaust port that communicate with the combustion chamber, and an intake valve and an exhaust valve that open and close the intake port and the exhaust port, respectively, comprising:
  a throttle device provided in an intake passage that communicates with the intake port, the throttle device comprising a throttle valve;
  a fuel injector that injects a fuel into the combustion chamber;
  an igniter that ignites an air/fuel mixture in the combustion chamber;
  a crank angle sensor that detects a crank angle of the internal combustion engine; and
  a controller that:
  operates the throttle device to open the throttle valve to a predetermined throttle opening at a throttle opening speed that is set based on an intake pressure during stopping of the engine;
  determines an expansion-stroke cylinder that is in an expansion stroke at the time of a start of the engine, based on the result of detection of the crank angle sensor; and
  upon a start of the engine, operates the fuel injector to inject the fuel into the expansion-stroke cylinder, and operates the igniter to ignite the air/fuel mixture in the combustion chamber of the expansion-stroke cylinder.

6. A starting system as defined in claim 5, wherein the controller sets the throttle opening speed at which the throttle valve is opened during stopping of the engine, such that the throttle opening speed decreases as the intake pressure increases.

7. A starting system as defined in claim 5, wherein the throttle opening speed at which the throttle valve is opened during stopping of the engine is set to the upper limit value of the throttle opening speed that decreases as the intake pressure increases.

8. A starting system as defined in claim 7, wherein the upper limit value of the throttle opening speed at which the throttle valve is opened during stopping of the engine is determined in view of the starting capability of the engine when starting and the quietness of the engine.

9. A starting method of an internal combustion engine including a combustion chamber, an intake port and an exhaust port that communicate with the combustion chamber, an intake valve and an exhaust valve that open and close the intake port and the exhaust port, respectively, a throttle device provided in an intake passage that communicates with the intake port, the throttle device comprising a throttle valve, fuel injecting means for injecting fuel into the combustion chamber igniting means for igniting an air/fuel mixture in the combustion chamber, and crank angle sensing means for detecting a crank angle of the internal combustion engine, comprising:
  operating the throttle device to open the throttle valve to a predetermined throttle opening at a throttle opening speed that is set based on an intake pressure during stopping of the engine;
  determining an expansion-stroke cylinder that is in an expansion stroke at the time of a start of the engine, based on the result of detection of the crank angle sensing means; and
  when the engine starts, operating the fuel injecting means to inject the fuel into the expansion-stroke cylinder, and operating the igniting means to ignite the air/fuel mixture in the combustion chamber of the expansion-stroke cylinder.

10. A starting method as defined in claim 9, wherein the throttle opening speed at which the throttle valve is opened during stopping of the engine is set such that the throttle opening speed decreases as the intake pressure increases.

11. A starting method as defined in claim 9, wherein the throttle opening speed at which the throttle valve is opened during stopping of the engine is set to the upper limit value of the throttle opening speed that decreases as the intake pressure increases.

12. A starting method as defined in claim 11, wherein the upper limit value of the throttle opening speed at which the throttle valve is opened during stopping of the engine is determined in view of the starting capability of the engine when starting and the quietness of the engine.

* * * * *